March 4, 1969
M. DANGAUTHIER
3,431,033
ELASTICALLY YIELDABLE ELEMENT FOR A BEARING AND
A BEARING INCLUDING SAID ELEMENT
Filed July 28, 1967
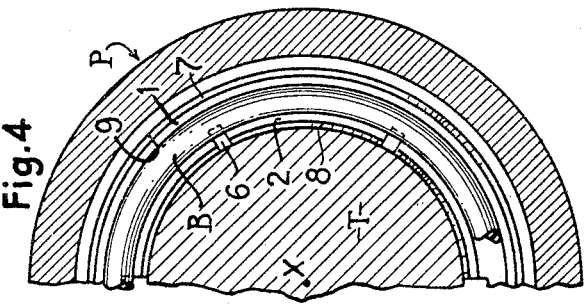
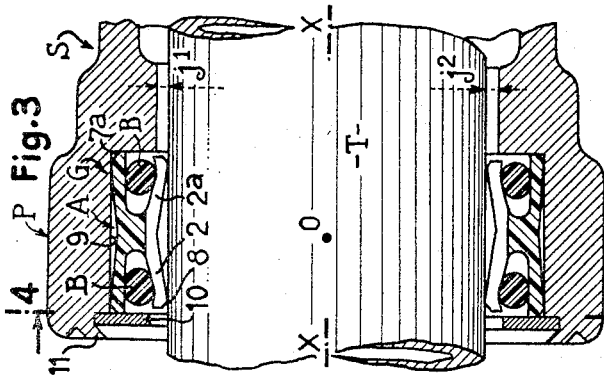
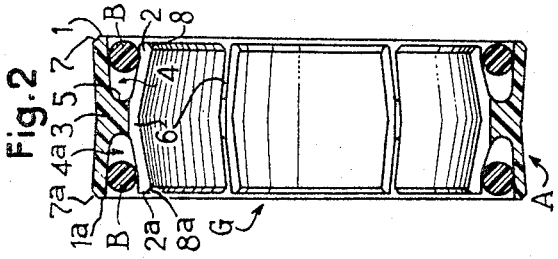
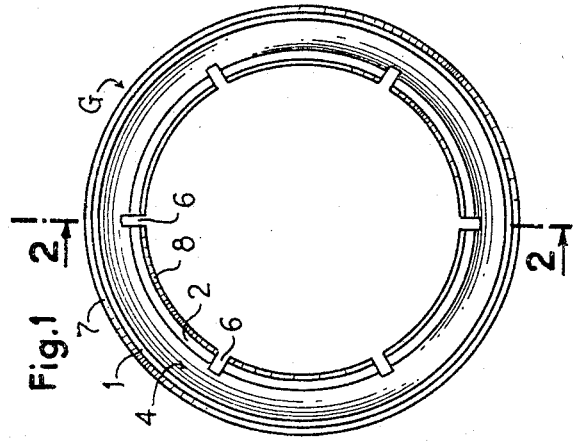
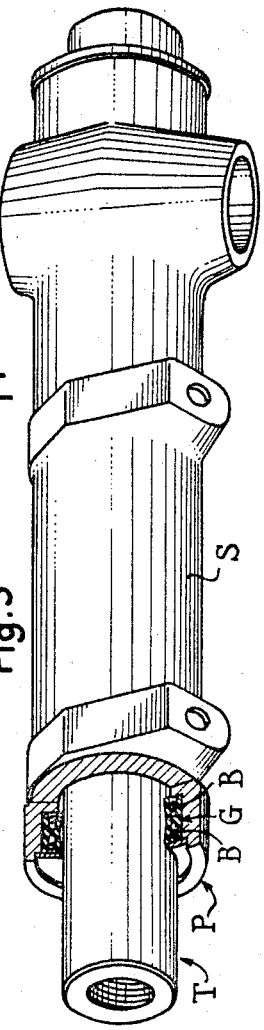

United States Patent Office 3,431,033
Patented Mar. 4, 1969

3,431,033
ELASTICALLY YIELDABLE ELEMENT FOR A BEARING AND A BEARING INCLUDING SAID ELEMENT
Marcel Dangauthier, Paris, France, assignor to Societe Industrielle et Commerciale des Automobiles Peugeot, Paris, France, a French body corporate
Filed July 28, 1967, Ser. No. 656,928
Claims priority, application France, Sept. 7, 1966, 75,470
U.S. Cl. 308—26  4 Claims
Int. Cl. F16c 27/02, 35/02, 33/02

ABSTRACT OF THE DISCLOSURE

Elastically yieldable element comprising a main ring of a rigid but elastically yieldable material having a radial section roughly in the shape of an H lying on its side, that is, having two pairs of outer and inner flanges forming therebetween lateral recesses, the inner flanges being cut by slots spaced circumferentially equal distances apart, and elastomer second rings disposed in the recesses and compressed between the flanges.

---

The present invention relates to an elastically yieldable element for a bearing and like applications, this element permitting in particular maintaining in an elastically yieldable manner in a tubular support a shaft capable of rotating and/or sliding in this support and the absorption of relatively large variations in the radial position of the axis of the shaft relative to the axis of the support and noticeable angular deviations of the shaft relative to the support.

This element is of utility in particular for guiding a rack controlling the steering of an automobile vehicle in a support constituted by the steering case and is in the form of a composite ring having a main ring which is of a material which is both rigid and elastically deformable and has a radial section roughly in the shape of a reclining H, namely a sectional shape having two pairs of outer and inner flanges, the outer flanges and inner flanges of each pair being divergent towards one of the lateral faces of the ring and forming therebetween a lateral recess and the inner flanges being cut at equally spaced distances apart on the periphery so as to facilitate the elastic deformation of the independent flange sections thus formed, and two second rings of an elastomer or like material disposed in said recess and compressed between the outer and inner flanges defining the corresponding recess.

When the composite ring is introduced between the two coaxial cylindrical surfaces of a shaft and the support therefor so as to form a bearing, the radial space between the surfaces being less than the distance between the ends of the inner and the outer flanges of each pair of flanges, the inner flanges are constrained to move apart elastically and elastically compress the second rings which therefore apply the inner flanges against the surface of the shaft and fully take up any radial play, even if the latter is not uniform.

Another object of the invention is to provide a bearing comprising a combination of a tubular support and the aforementioned element which is disposed in this support between two lateral retaining abutments.

A further object of the invention is to provide applications of such a bearing in particular in the steering of automobile vehicles.

Further features and advantages of the invention will be apparent from the ensuing description with reference to the accompanying drawing.

In the drawing:
FIG. 1 is an end elevational view of an elastically yieldable element according to the invention, the front ring having been removed;
FIG. 2 is a diametral sectional view taken along line 2—2 of FIG. 1;
FIG. 3 is a diametral sectional view of a bearing including said element;
FIG. 4 is a half diametral sectional view taken along line 4—4 of FIG. 3, and
FIG. 5 is a view of such a bearing employed in an automobile vehicle steering mechanism.

In the embodiment shown in FIGS. 1 and 2, the elastically yieldable element G according to the invention comprises the combination of a main ring A and two secondary or second rings B.

The ring A is of a material which is both rigid and elastically deformable and preferably of a plastics material, such as a treated or untreated polyamide or superpolyamide.

This ring A has roughly the shape of an H lying on its side, that is to say, the ring has a pair of outer flanges 1 or 1$^a$, and a pair of inner flanges 2 or 2$^a$. The inner and outer flanges of each pair are divergent from a massive middle portion 3 towards the lateral faces of the ring and they form therebetween a recess 4 or 4$^a$. Each recess is laterally open and its radial width decreases progressively from the entrance to tthe end, such as 5, of the recess. The inner flanges 2, 2$^a$ and a part of the middle portion 3 are cut by longitudinally extending slots 6 which are circumferentially equally spaced apart so that the inner flanges 2, 2$^a$ consist of independent sections.

The outer and inner flanges have at their ends chamfers 7, 7$^a$ and 8, 8$^a$, respectively.

The second rings B are of rubber (for example having a round trapezoidal or square section). They are engaged in the recesses 4 and 4$^a$, one ring being disposed in each recess. Their dimensions in the free state are such that they extend into the entrances of the recesses without substantial deformation, as shown in FIG. 2.

FIGS. 3 and 4 show an application of the element G of FIGS. 1 and 2 in a bearing P between a tubular support S and a shaft T which can be slidable and/or rotatable therein, this shaft being for example the rack T (FIG. 5) of a steering mechanism, the support S being in this case the steering case.

The element G comprising the ring A and rings B is tightly engaged in a counterbore 9 (FIGS. 3 and 4) in the support S, the engagement thereof being facilitated by the chamfer 7$^a$ of the ring A. The element is held in position for example by a metal washer 10 which is itself held in position by, for example, the forming over at 11 of the inner portion of the end face of this support S.

The steering rack or other shaft T is then engaged in the element G, this engagement being facilitated by the chamfer 8 of the sections of the inner flange 2. The two inner flanges 2 and 2$^a$ are urged elastically outwardly and partly crush the rings B.

The latter exert a reaction and elastically maintain the two inner flanges 2 and 2$^a$ against the outer surface of the shaft T. The latter is therefore guided by the bearing without the slightest play. On the other hand, large radial clearances such as $j^1$, $j^2$ can be maintained between the shaft T and the support S, these clearances being equal or unequal, constant or not constant. Indeed, the axis X—X of the shaft T can coincide or not coincide with the axis of the support S with respect to which it can assume a certain off-centre position. The two axes can remain parallel or not, since slight deflections are possible about the centre O of the element G owing to the possibilities of elastic deformation of the component parts of the composite ring constituting said element G. For the same reasons of elasticity, the element G automatically takes up any play due to any possible wear.

It will be understood that, owing to the nature of the constituent materials of the element G (plastics or elastomer material) the bearing is completely silent.

Although specific embodiments of the invention have been described, many modifications and changes may be made therein without departing from the scope of the invention as defined in the appended claims.

Having now described my invention, what I claim as new and desire to secure by Letters Patent is:

1. An elastically yieldable element for a bearing and like applications, said element being a composite ring comprising a main ring which is of a material which is both rigid and elastically deformable and has a radial section roughly in the shape of a reclining H, namely a sectional shape having two pairs of outer and inner flanges, the outer flanges and inner flanges of each pair being divergent towards one of the lateral faces of the ring and forming therebetween a lateral recess and the periphery of each of the inner flanges having circumferentially equispaced apertures so as to facilitate the elastic deformation of the independent flange sections thus formed, and two second rings of an elastomer material respectively disposed in said recesses and compressed between the outer and inner flanges defining the corresponding recess.

2. An element as claimed in claim 1, wherein the flanges terminate in chamfered portions which facilitate mounting the element in a support and on a shaft.

3. An element as claimed in claim 1, wherein the main ring is of treated and untreated polyamide.

4. A bearing for example the steering mechanism of an automobile vehicle, said bearing comprising in combination a tubular support and an elastically yieldable composite ring comprising a main ring which is of a material which is both rigid and elastically deformable and has a radial section roughly in the shape of a reclining H, namely a sectional shape having two pairs of outer and inner flanges, the outer flanges and inner flanges of each pair being divergent towards one of the lateral faces of the ring and forming therebetween a lateral recess and the periphery of each of the inner flanges having circumferentially equispaced apertures so as to facilitate the elastic deformation of the independent flange sections thus formed, and two second rings of an elastomer material respectively disposed in said recesses and compressed between the outer and inner flanges defining the corresponding recess.

References Cited

UNITED STATES PATENTS 3,115,375   12/1963   Haller _____ 308—72

CARROLL B. DORITY, Jr., *Primary Examiner.*

U.S. Cl. X.R.

308—238